United States Patent [19]

Raythatha et al.

[11] Patent Number: 5,022,924

[45] Date of Patent: Jun. 11, 1991

[54] METHOD FOR REDUCING THE ABRASION OF CALCINED CLAY

[75] Inventors: Rasik H. Raythatha, Kingwood, Tex.; Paul R. Suitch, Milledgeville; E. Wayne Andrews, Sandersville, both of Ga.

[73] Assignee: ECC America Inc., Atlanta, Ga.

[21] Appl. No.: 482,541

[22] Filed: Feb. 21, 1990

[51] Int. Cl.$^5$ ............................................... C04B 14/10
[52] U.S. Cl. ..................................... 106/486; 106/416; 501/144; 501/145
[58] Field of Search ........................ 162/181.6, 181.8; 106/416, 485, 486; 501/144, 145, 150

[56] References Cited

U.S. PATENT DOCUMENTS

| 3,014,836 | 12/1961 | Proctor, Jr. | |
|---|---|---|---|
| 3,586,523 | 6/1971 | lFanselow et al. | |
| 4,375,373 | 3/1983 | Abe et al. | 106/491 |
| 4,381,948 | 5/1983 | McConnell et al. | |
| 4,561,597 | 12/1985 | Cook et al. | |
| 4,693,427 | 9/1987 | Bilimoria et al. | |
| 4,717,559 | 1/1988 | Cummings et al. | |
| 4,816,074 | 3/1989 | Raythatha et al. | 501/150 |
| 4,830,673 | 5/1989 | Jones et al. | |

*Primary Examiner*—Karl Group
*Attorney, Agent, or Firm*—Klauber & Jackson

[57] ABSTRACT

A method is provided for reducing the abrasiveness of calcined clay, e.g., kaolin clay. The method comprises intermixing the clay prior to calcination with a finely-divided silica, preferably in the form of colloidal or fumed silica, in an amount sufficient to reduce the abrasiveness of the calcined product.

11 Claims, No Drawings

METHOD FOR REDUCING THE ABRASION OF CALCINED CLAY

FIELD OF THE INVENTION

This invention relates generally to calcined clay products, and more particularly, relates to a method for reducing the abrasion value of an anhydrous white kaolin clay pigment.

BACKGROUND OF THE INVENTION

In the course of manufacturing paper and similar products, including paperboard and the like, it is well known to incorporate quantities of inorganic materials into the fibrous web in order to improve the quality of the resulting product. In the absence of such "fillers", the resultant paper can have a relatively poor texture due to discontinuities in the fibrous web. The fillers are also important in improving the printing qualities of the paper, i.e., by improving the surface characteristics. The use of appropriate fillers additionally improves the opacity and the brightness of a paper sheet of a given weight.

A number of inorganic materials have long been known to be effective for many of the aforementioned purposes. Among the best of these materials is titanium dioxide, which can be incorporated into the paper in the form of anatase or rutile. Titanium dioxide, however, is among the most expensive materials for such purposes. Thus, despite the effectiveness of such a material as a filler, its use is limited, and satisfactory replacements have been sought.

Among the materials which have found increasing acceptance as paper fillers are calcined kaolin clays. Materials of this type are generally prepared by partially or fully calcining a crude kaolin clay, which may have been initially subjected to prior beneficiation steps in order to remove certain impurities, e.g., for the purpose of improving brightness in the ultimate product. Such products are described in, for example, U.S. Pat. Nos. 3,014,836 to Proctor, Jr., and 3,586,523 to Fanselow et al. as well as in McConnell et al, U.S. Pat. No. 4,381,948.

Those properties which render a calcined kaolin pigment particularly valuable for use as a filler are well known. The brightness and opacifying characteristics are important in producing an acceptable paper sheet, i.e., a sheet which has whiteness, high opacity, good printability and light weight. Additionally, low abrasiveness (i.e. a low abrasion value as measured by standard tests) is significant in order to assure that the resultant paper product may be manufactured and processed using conventional machinery without damaging the machinery.

It is important for an understanding of the present invention, to recognize that those skilled in the art of kaolin processing draw a sharp and fundamental distinction between uncalcined and calcined kaolins. With respect to terminology, it is noted that the prior art literature, including numerous of the prior art patents relating to the field of kaolin products and processing, often uses the term "hydrous" to refer to a kaolin which has not been subjected to calcination—more specifically, which has not been subjected to temperatures above about 450° C., which temperatures serve to alter the basic crystal structure of kaolin. These so-called "hydrous" clays may have been produced from crude kaolins, which have been subjected to beneficiation, as, for example, to froth flotation, to magnetic separation, to mechanical delamination, grinding, or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the composition can be (and often is) arbitrarily written in the form $2H_2O.Al_2O_3.2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. As used in this specification, the term "calcined kaolin" shall refer to such a kaolin. Preferably the calcined kaolin has been heated above the 980° C. exotherm, and therefore is "fully calcined", as opposed to having been rendered merely a "metakaolin". Reference may be had in the foregoing connection to Proctor. U.S. Pat. Nos. 3,014,836 and to Fanselow et al. 3,586,823, which disclosures are representative of portions of the prior art pertinent to fully calcined kaolins.

A calcined product having characteristics generally superior to previously available such calcined kaolin pigments, is the ALPHATEX ® product of E.C.C. America Inc., assignee of the present application. This product again is a substantially anhydrous white kaolin clay pigment, which has unusual efficacy as a filler in paper sheets and similar paper products. The pigment also has application as a coating pigment for paper, and as a pigment in paints and other filled systems. It generally consists of aggregates of anhydrous kaolin clay particles, and exhibits exceptionally high lightscatter and opacifying characteristics when incorporated as a filler in paper.

ALPHATEX ® is further described in U.S. Pat. No. 4,381,948 to A.D. McConnell et al. as being an anhydrous white kaolin clay pigment having high light scattering when incorporated as a filler in paper, the pigment consisting of porous aggregates from sub-micron sized kaolin clay platelets obtained by classification of a dispersed kaolin clay to a 100% less than one micron ESD fraction, the aggregates having an average specific gravity in the range of 0.5 to 0.6 and a mean internal pore size of less than 0.55 microns. The size distribution of the aggregates is such that no more than 5% by weight thereof are greater than 10 microns ESD, at least 75% are of less than 2 microns ESD, and not more than 15% by weight are of less than 1 micron ESD. The pigment has a Valley abrasion value below 30 mg., and a G.E. brightness of at least 93.

There is a continuing search in the kaolin industry for methods for decreasing the abrasion of a calcined kaolin pigment. It is highly desirable that when a method for improving such a property is discovered that it not detrimentally affect another property. For example, if a method is derived for reducing the abrasion of a calcined kaolin pigment, it is highly desirable that such method not materially affect the brightness or opacifying characteristics of the kaolin.

From time to time various methodology has been reported for reducing the abrasiveness of calcium clays by means of additives and the like. One such example is disclosed in the present assignee's, U.S. Pat. No. 4,830,673 to Jones et al. Reduction of abrasiveness is effected therein by contacting the clay prior to calcination with an aliphatic diol, such as ethylene glycol. This process is effective but glycols are relatively expensive materials and it is desirable to improve the economics of abrasiveness reduction as well as to provide an effective alternative method.

OBJECTS OF THE INVENTION

In accordance with the foregoing, it may be regarded as an object of the present invention, to provide an improved, highly effective and more economical method for reducing the abrasion of calcined clays, in particular of calcined kaolin clays.

It is a further object of this invention, to provide a method of the character indicated for reducing the abrasion of said kaolins without detrimentally affecting the brightness or opacity-producing characteristics provided by said kaolins.

A still further object of the invention, is to provide a method for reducing the abrasion of a fully calcined kaolin pigment, wherein a readily available and easily incorporated additive, enables reduction in the calcining temperatures which are otherwise required to produce a fully calcined pigment.

Yet a further object of the invention, is to provide a method of the foregoing character, which in addition to reducing abrasion, also effects a reduction in the undesired, but easily water extractable ionic barium impurity which can cause scaling during paper making processes, and which method also acts to provide buffers against abrasion causing fluxing ions such as sodium and potassium.

SUMMARY OF THE INVENTION

Now in accordance with the present invention, the foregoing objects and others as will become apparent in the course of the present specification, are achieved by a method for reducing the abrasion of calcined kaolins, according to which the kaolin calciner feed is intermixed prior to calcining with an effective abrasion reducing amount of a finely divided silica, i.e., a silica preferably having a particle size of less than about 1,000 Angstroms (0.1 $\mu$). The silica is preferably added in the form of colloidal or fumed silica.

Particularly preferred clays are those calcined kaolin clays described, for example in the aforementioned U.S. Pat. Nos. 3,014,836 and 3,586,523 and 4,381,948, the entire disclosures of which are incorporated herein by reference. However, the method of the invention is applicable to other calcined kaolin clays.

Preferably, calcination after addition of the silica, is carried out at a temperature of not higher than about 1125° C., preferably in the range of 900°-1100° C., more preferably from about 975° to 1075° C., especially about 1025° C. The effective amount of finely-divided silica ranges from about 0.2 to about 3%, and preferably about 0.25 to 2% by weight of dry clay of the kaolin clay utilized. Although the silica may be added at a variety of process points prior to calcining, in a preferred procedure the silica is admixed with the beneficiated and classified kaolin slurry prior to its being dewatered (e.g. by spray drying) to form the calciner feed.

DESCRIPTION OF PREFERRED EMBODIMENTS

The method of the present invention is applicable to the preparation of any of the well-known types of calcined kaolin clays—i.e., the method may be practiced to treat the feed clay which is calcined to produce such known calcined clays. For example, the method of this invention may be applied in the preparation of the kaolin clay described in U.S. Pat. No. 3,014,836 to Proctor. Jr. Proctor. Jr. thus describes a calcined kaolin powder having an abrasion as determined by the "Valley" method described therein, and a certain minimum brightness. The method of this invention may also be used in preparing the kaolin product described in U.S. Pat. No. 3,586,523 to Fanselow et al. Fanselow et al describes a finely divided, substantially anhydrous amorphous aluminum silicate obtained by calcining a fine particle size sedimentary kaolin clay.

Where superior light scattering properties are desired, a particularly preferred kaolin for treating by the method of this invention is that described in U.S. Pat. No. 4,381,948 to A.D. McConnell et al. The calcined product described therein is an anhydrous white kaolin clay pigment consisting of porous aggregates of kaolin clay platelets which exhibit exceptionally high light scattering ability when incorporated as a filler in paper. This pigment exhibits a Valley abrasion value below 30 mg, and preferably below 20 mg, and a GE brightness of at least about 93. In all instances in this specification, brightness values are obtained according to the standard specification established by TAPPI procedure T-646 OS-75. When incorporated as a filler in paper, the McConnell et al pigment displays an exceptionally high light scattering coefficient. This pigment substantially corresponds to the commercially available product ALPHATEX ® of the assignee Anglo-American Clays Corporation (Atlanta, Ga.). Thus, as described in McConnell et al. the preferred crude kaolin may comprise one including a high percentage, e.g. 80% or more by weight, of particles less than 2 microns ESD, and having an index of crystallinity less than 0.5. This latter type of clay includes many of the so-called "hard" kaolins found in parts of the Southeastern United States, including Georgia, S.C. and elsewhere; and also includes similar clays of this type found in other deposits, such as e.g. in the Charente district of France.

The said crude can also be a soft cream, Georgia kaolin, of the type which is very common in numerous parts of Georgia. These clays are characterized, among other factors, by a moderate percentage, e.g. 50-60% by weight of particles less than 2 microns ESD and an index of crystallinity of about 1. (The method for determining crystallinity values is described in Bates, T.F., and Hinckley, D.N. (1959) *Mineralogy and Petrology of the Kaolin Clays of the Piedmont and Coastal Plain Regions of Southeastern United States: Progress Report*, June 1, 1958—June 1, 1959, The Pennsylvania State University, University Park, Pa.

In a preferred method for practicing this invention, the crude kaolin clay is blunged and dispersed to form an aqueous dispersion. The blunged and dispersed aqueous slurry is subjected to a particle size separation, from which there is recovered a fine fraction slurry of the clay. Following this, the clay may be dewatered by being flocculated and filtered, redispersed as a slurry, and dried, e.g., in a spray dryer or the classified slurry may be dewatered by directly drying. Pursuant to the present invention, the finely-divided silica is preferably added to the clay slurry which is fed to the dryer. Alternatively, but less preferably the silica can be added to the clay after drying, most suitably after pulverizing. Drying of the slurry can be effected by various means, e.g., as mentioned, by spray drying—to produce an essentially moisture-free clay.

The dried clay is then thoroughly pulverized to break up agglomerates. The pulverized product is then calcined by heating to a temperature of at least about 900° C., and under conditions such that substantially none of the clay is heated to a temperature in excess of about 1100° C. Thereupon the product of the calcination step is cooled and pulverized to provide the final pigment product. The calcined product can also be subjected to additional milling to improve its bulk handling characteristics, as set forth, e.g., in U.S. Pat. Nos. 4,693,427 and 4,561,597. This method can also be practiced in improved calcination systems, such as those disclosed in Cumminos et al. U.S. Pat. No. 4,717,559, which describes a spray drying-pulverizing-calcining system including heat recovery features. The disclosure of said Cummings et al U.S. Pat. No. 4,717,559 is incorporated herein by reference.

Pursuant to the invention, the aforementioned kaolin clays are thus intermixed prior to calcining with an effective abrasion-reducing amount of a finely-divided silica. By the term finely divided is meant an average particle size of not more than about 1,000 Angstroms. For the purposes of the invention, silica in the form of fumed silica, colloidal silica, and solutions of sodium silicate, i.e. wherein free fine silica is present, silicic acid, and the like can be used.

The effective amount of silica utilized is, for general guidance, from about 0.2 to 3%, preferably from about 0.25 to 2% by weight of the amount of clay, calculated on a dry clay basis. Any method of intermixing the silica with the calciner feed clay may be utilized. As previously mentioned, it is preferred, to mix the silica with the slurried feed to the drier. It can, however, be added to the calciner feed after the drying steps, most suitably after pulverizing.

It has been found that the aforementioned method of producing calcined clay, particularly calcined kaolin clay, produces a clay having a reduced abrasion without detrimentally affecting the brightness of the clay. Indeed, in many cases, the brightness of the clay is enhanced. Furthermore, it has been observed that the barium content of the clay is reduced in most instances. Barium is known to cause scaling during the paper-making process and its reduction is obviously beneficial. Without intending to be bound by any particular theory, it is thought that the addition of silica reduces the amount of crystalline gamma-$Al_2O_3$ while increasing the amount of mullite in the material. A decrease in the gamma-$Al_2O_3$ composition of the treated samples has been noted. These observations indicate that the free $SiO_2$ in the system reacts with gamma-$Al_2O_3$ during calcination to form a less abrasive mullite phase, thus reducing the effective abrasion of the calcined product.

Practice of the present invention will now be illustrated by Examples, which are deemed illustrative of both the process taught by the present invention and the product yielded in accordance with the invention.

The addition of a finely-divided silica as aforedescribed prior to calcination of the feed clay for ALPHATEX® brand clay from Anglo-American Clays Corporation, resulted in a significant reduction in abrasion values. It was also found that the other desirable physical properties of the clay, such as brightness were not significantly changed. G.E. brightness was measured by TAPPI Procedure T646-oS 75. The procedure for determining Breunig Abrasion is set forth in Table II of U.S. Pat. No. 4,678,517; the disclosure of said Table II is incorporated herein by reference.

EXAMPLE 1

In this Example the crude clays used as a starting material was a fine particle size "hard" Georgia kaolin clay of the type described in the above-mentioned McConnell patent. This crude was processed by the steps of blunging, degritting, and dispersing, fractionating to substantially 100% <1 micrometer; flocculating and filtering; redispersing the filter cake; and treating the resulting redispersed slurry about 60% solids with various amounts of finely-divided silica in the form of colloidal silica sold under the trade name Ludox by E. I. du Pont de Nemours and Co. Thereafter, the slurry was spray-dried, and pulverized, and then calcined at an average temperature of 1079° C. for 30 minutes. Breunig abrasion was determined for the calcined products and is shown in Table 1:

TABLE 1

| Sample and % of Silica | Breunig Abrasion |
|---|---|
| *Control 1 (No Ludox** AS-40) | 51.4 |
| 1% as Ludox AS-40 | 43.5 |
| 2% as Ludox AS-40 | 46.3 |
| *Control 2 (No Ludox AS-40) | 49.1 |
| 0.5% as Ludox AS-40 | 41.2 |
| 0.25% as Ludox AS-40 | 44.6 |

*Sample lots for Control 1 and the 1 and 2% silica addition samples were prepared and run separately from the Control 2 and .5 and 0.25% silica added samples.
**Aqueous dispersion of colloidal silica, available from E. I. DuPont de Nemours & Co. (Ludox is a DuPont trademark).

EXAMPLE 2

Example 1 was repeated except that calcining of the spray-dried and pulverized clay was carried out at an average temperature of 1025° C. and the addition of silica was limited to 0.5% and below. Results are shown in the following Table 2:

TABLE 2

| Sample and % of Silica | Breunig Abrasion |
|---|---|
| *Control 1 (No Ludox AS-40) | 45.7 |
| 0.5% as Ludox AS-40 | 42.3 |
| 0.25% as Ludox AS-40 (average) | 38.9 |
| *Control 2 (No Ludox AS-40) | 46.9 |
| 0.2% as Ludox AS-40 | 35.6 |
| 0.125% as Ludox AS-40 | 44.0 |
| 0.25% as Ludox AS-30 | 31.0 |
| 0.25% as Ludox K | 29.9 |

*See note for Table 1.

EXAMPLE 3

This Example was carried out with another but similar Georgia kaolin clay calcined at an average temperature of 1025° C. and 0.25% silica to demonstrate a consistent lowering of the abrasion even though the absolute value varied somewhat from sample to sample. Data appear in Table 3 below:

TABLE 3

| Sample | Breunig Abrasion |
|---|---|
| Control | 44.9 |
| 0.25% as Ludox AS-40 | 40.6 |
| 0.25% as Ludox AS-40 | 41.8 |

TABLE 3-continued

| Sample | Breunig Abrasion |
|---|---|
| 0.25% as Ludox AS-40 | 39.5 |
| 0.25% as Ludox AS-40 | 42.3 |
| 0.25% as Ludox AS-40 | 36.7 |
| 0.25% as Ludox AS-30 | 38.7 |
| 0.25% as Ludox K | 29.9 |

The outstanding effectiveness of Ludox K was due to the presence of the K+ ion which is less of a mineralizer than Na+. This is believed to reduce the amount of abrasive crystalline material in the calcined clay.

EXAMPLE 4

In this Example a Georgia kaolin clay was used which was prepared for spray drying as described in Example 1, except that the silica was added in the form of fumed silica (Cabosil® LM 130 product of Cabot Corporation) and was mixed dry with the spray dried and pulverized feed to the calciner, and not only the abrasion of the finished product was measured, but the G.E. brightness as well. Average calcining temperatures of 960° C., 1015° C. and 1079° C. were employed in various cases. Calcining temperatures and values determined for the product are shown in the following Table 4:

TABLE 4

| Sample and % of Silica | Temperature, °C. | Breunig Abrasion | Brightness (%) |
|---|---|---|---|
| Control (No fumed silica) | 1079 | 75.1 | 92.4 |
| 2% as fumed silica | 960 | 56.5 | 92.1 |
| 2% as fumed silica | 1015 | 57.6 | 92.4 |
| 2% as fumed silica | 1079 | 59.9 | 93.0 |
| 3% as fumed silica | 1079 | 52.5 | 92.9 |
| 3% as fumed silica | 1125 | 61.0 | 93.1 |

It will be observed that the addition of silica does not materially affect the brightness and, indeed, enhanced it in some cases.

EXAMPLE 5

A Georgia kaolin clay was used in this example and processed as described in Example 1 except that the silica was added in the amount of 2% to the slurry prior to spray drying in the form of fumed silica in the amount of 2% based on the dry weight of the clay. Calcining was carried out at various average temperatures and the final product was measured for abrasion, G.E. brightness and barium content. The following Table 5 sets forth calcining temperatures and values determined for the calcined product.

TABLE 5

| Temperature (°C.) | Abrasion Breunig | Brightness (%) | Barium (ppm) |
|---|---|---|---|
| Controls | | | |
| 960 | 41.8 | 91.8 | 33.7 |
| 1025 | 51.8 | 92.6 | 6.2 |
| 1079 | 51.4 | 92.6 | 4.5 |
| 1125 | 58.2 | 93.2 | 1.6 |
| 1199 | 115.8 | 93.7 | 0.24 |
| 2% Silica | | | |
| 960 | 23.1 | 91.4 | 34.4 |
| 1025 | 38.4 | 92.2 | 5.1 |
| 1079 | 41.8 | 92.6 | 1.9 |
| 1125 | 58.2 | 93.0 | n.d. |
| 1199 | 130.0 | 93.4 | n.d. |

EXAMPLE 6

Following the procedure described in Example 5, except that the fumed silica was also used in the amounts 1% and 3%, a Georgia kaolin clay was used for the experiments of this example. Details are found in Table 6 below:

TABLE 6

| Temperature (°C.) | Abrasion Breunig | Brightness (%) | Barium (ppm) |
|---|---|---|---|
| Control | | | |
| 1025° | 49.1 | 92.5 | 7.5 |
| 1079° | 55.3 | 92.1 | n.a. |
| 1% Silica | | | |
| 1025° | 42.3 | 92.3 | 5.9 |
| 1079° | 51.9 | 92.4 | 5.2 |
| 2% Silica | | | |
| 1025° | 38.9 | 92.0 | 6.7 |
| 1079° | 53.1 | 92.4 | 5.7 |
| 3% Silica | | | |
| 1025° | 38.9 | 92.2 | 2.8 |
| 1079° | 55.3 | n.a. | 5.3 |

EXAMPLE 7

In order to compare the form of the silica added as a factor in abrasion reduction, a Georgia kaolin having a Breunig abrasion of 49.1 when calcined at 1025° C. was processed as described in Example 1 and the silica was added as fumed silica, colloidal silica or silicic acid. Table 7 below shows the results:

TABLE 7

| Sample | Abrasion (Breunig) 1025 C | Percent Reduction |
|---|---|---|
| Control | 49.1 | — |
| 2% as Fumed Silica | 38.9 | 21.0 |
| 2% as Colloidal Silica | 47.1 | 4.0 |
| 0.5% as Colloidal Silica | 41.2 | 16.0 |
| 0.25% as Colloidal Silica | 38.9 | 21.0 |
| 0.25% as Silicic Acid | 46.3 | 5.7 |

While the present invention has been particularly set forth in terms of specific embodiments thereof, it will be understood that various changes may be made without departing from the invention as defined in the appended claims. It is intended, therefore, that all matter contained in the foregoing description is to be interpreted as illustrative only and not in a limiting sense.

We claim:

1. A method for reducing the abrasiveness of calcined kaolin clay, comprising admixing the clay prior to calcining with from about 0.2 to 3% by weight of a finely divided silica based on the dry weight of the kaolin clay; followed by a calcining step.

2. The method of claim 1, wherein the silica is in the form of a suspension of colloidal finely-divided silica.

3. The method of claim 1, wherein the silica is in the form of a fumed finely-divided silica.

4. The method of claim 1, wherein the amount of finely-divided silica is from about 0.25 to 2% by weight.

5. The method of claim 2, wherein the amount of finely-divided silica is from about 0.25 to 2% by weight.

6. In the method for producing an anhydrous high-brightness white kaolin clay pigment for incorporation as a filler in paper; said process comprising the steps of blunging and dispersing a crude kaolin clay to form an aqueous clay dispersion subjecting said aqueous clay dispersion to a particle size separation, and recovering from said separation a fine particle size fraction slurry of said clay, dewatering said clay slurry to produce a substantially moisture-free clay; milling said substantially moisture-free clay to break up agglomerates; calcining said substantially moisture-free milled clay by heating to a temperature of at least about 900° C., and under conditions such that substantially none of said clay is heated to a temperature in excess of about 1100° C.; and cooling the calcined clay from said calcination step and milling same; the improvement for reducing the abrasiveness of the said calcined kaolin clay, comprising:
mixing said clay prior to calcining with from about 0.2 ti 3% by weight of a finely-divided silica base on the dry weight of the kaolin clay.

7. A method in accordance with claim 6, wherein said silica is in the form of colloidal finely-divided silica.

8. A method in accordance with claim 6, wherein said finely-divided silica is fumed silica.

9. A method in accordance with claim 6, wherein the amount of said finely-divided silica is from about 0.25 to 2% by weight.

10. A method in accordance with claim 6, wherein said dewatering of said clay slurry includes feeding said clay slurry as an aqueous slurry to a dryer; said finely-divided silica being added to said slurry in advance of said dryer.

11. A method in accordance with claim 6, wherein said slurry includes spray drying and said finely-divided silica is added to the slurry prior to the spray-drying.

* * * * *